Figure 8:
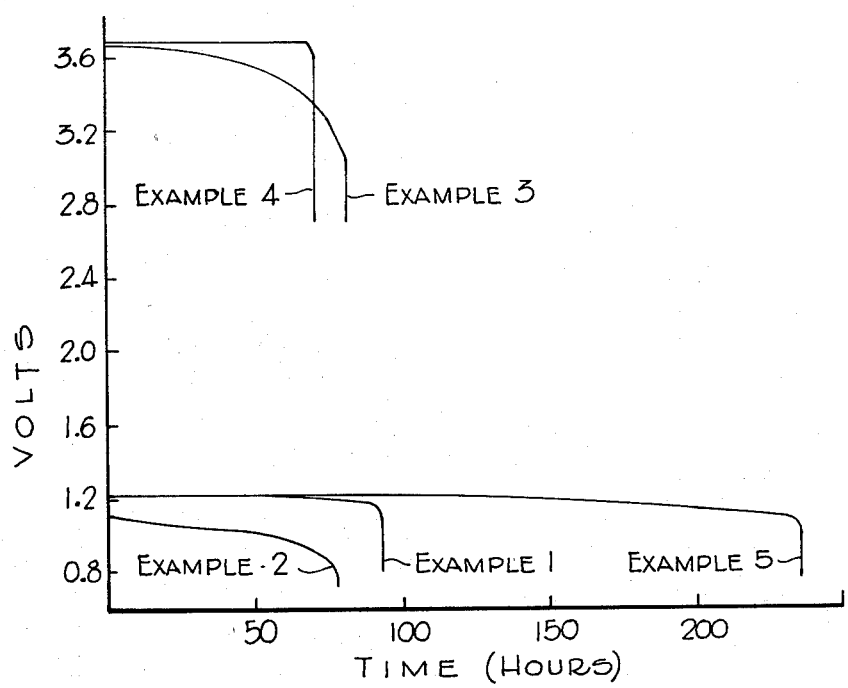

United States Patent [19]

Armstrong

[11] 4,184,009
[45] Jan. 15, 1980

[54] BUOYANT METAL/AIR BATTERY

[75] Inventor: William A. Armstrong, Ottawa, Canada

[73] Assignee: Her Majesty the Queen in right of Canada, as represented by the Minister of National Defence, Ottawa, Canada

[21] Appl. No.: 961,015

[22] Filed: Nov. 15, 1978

[30] Foreign Application Priority Data

Dec. 13, 1977 [CA] Canada .................................. 292984

[51] Int. Cl.² .......................................... H01M 12/06
[52] U.S. Cl. .................................. 429/27; 429/29; 429/72; 429/119; 429/247
[58] Field of Search ................ 429/27, 29, 46, 72, 429/119, 110, 158, 159, 247; 9/8.3 R, 8.3 E; 43/17.5

[56] References Cited

U.S. PATENT DOCUMENTS

| | | | |
|---|---|---|---|
| 2,964,583 | 12/1960 | Fafa et al. | 429/119 |
| 2,997,518 | 8/1961 | Klopp et al. | 429/110 |
| 3,589,945 | 6/1971 | Christopher et al. | 429/27 |
| 3,598,655 | 8/1971 | Hamleu et al. | 429/27 |
| 3,966,497 | 6/1976 | Honer | 429/119 |
| 4,129,684 | 12/1978 | Watanabe | 429/27 |

*Primary Examiner*—Skapars, Anthony S.
*Attorney, Agent, or Firm*—Cushman, Darby & Cushman

[57] ABSTRACT

The invention disclosed is a floating metal/air battery wherein the anode is immersed in an electrolyte, and the cathode is exposed to the atmosphere. An electro-conductive path between the anode and cathode is achieved by a wick means in contact with the electrolyte. Embodiments are described for use in sea-water and in fresh water.

19 Claims, 10 Drawing Figures

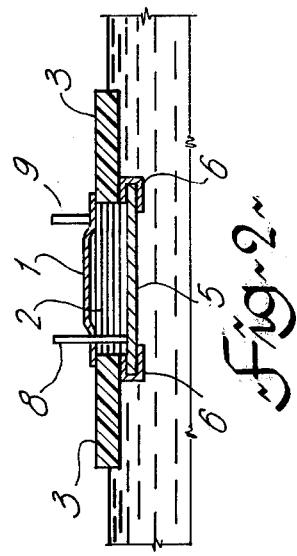
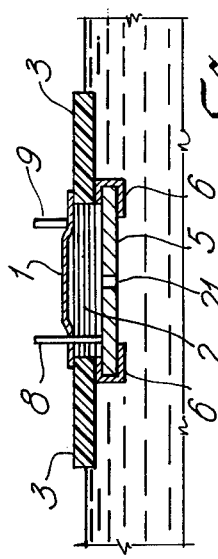
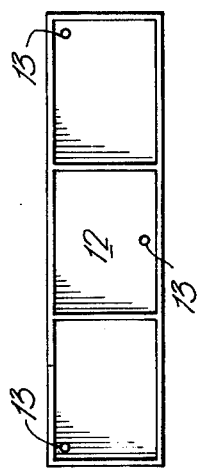
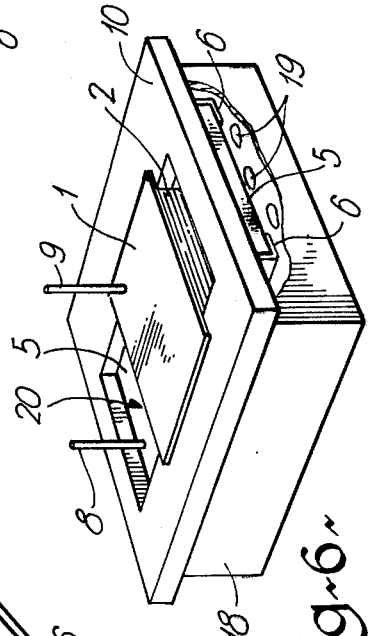
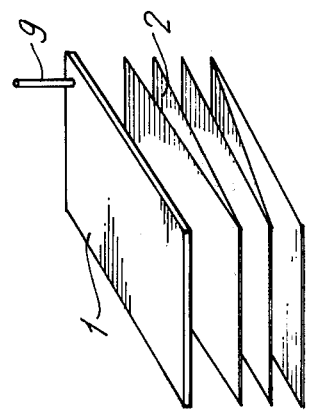
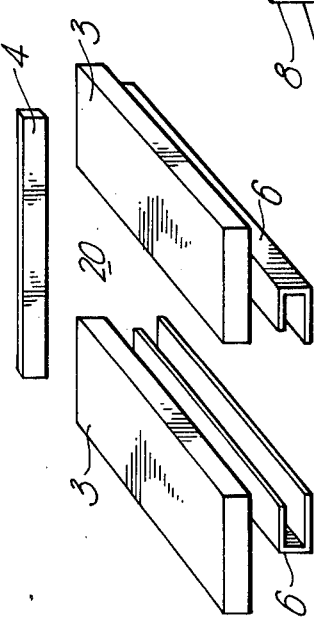
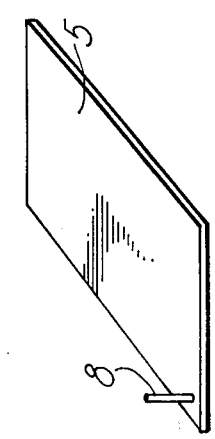

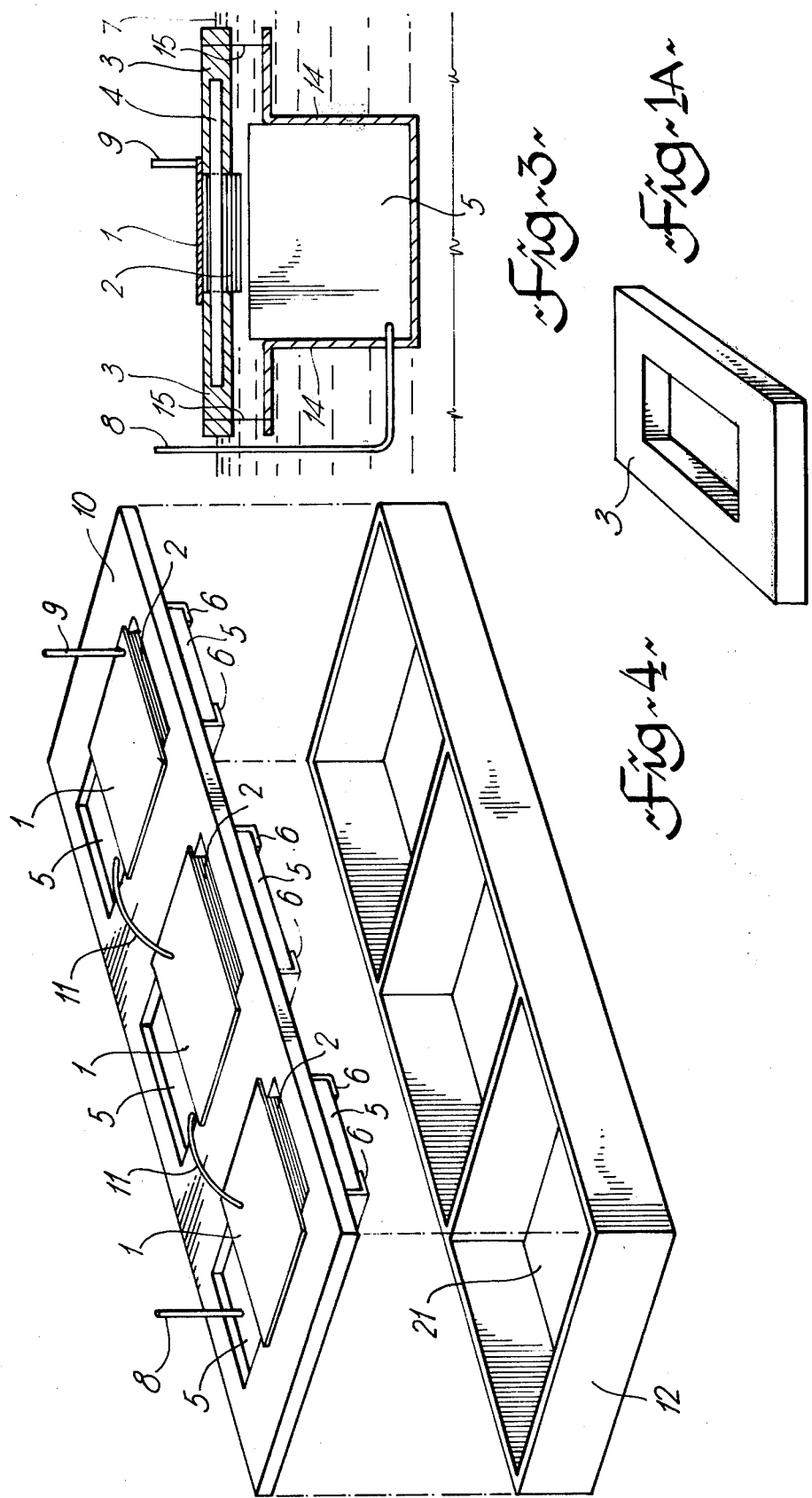

BUOYANT METAL/AIR BATTERY

This invention relates to metal/air electrochemical cells and in particular to a floating metal/air battery for use in sonobuoys and the like.

There are two common classes of reserve primary batteries which operate by immersion in seawater. One class employs a consumable anode of magnesium with an inert cathode material such as steel wool. The cathode acts as a depolarizer by consuming the hydrogen which is released at the anode. Such batteries, described for example in U.S. Pat. No. 3,401,063 which issued Sept. 10, 1968 to C. L. Opitz, can be discharged at low voltage (0.35 to 0.7 V) for long periods of time. A second class described for example in U.S. Pat. No. 3,966,497 which issued June 29, 1976 to H. N. Honer, employs zinc, aluminum or magnesium anodes and silver chloride, copper chloride or lead chloride cathodes. Both anode and cathode are consumed during discharge. Both these classes of battery also require complete immersion of anodes and cathodes in seawater or some other saline electrolyte. Further, these batteries comprise a number of interconnected cells arranged side by side. In this type of arrangement, the electrolyte is free to move from cell-to-cell setting up current paths between the cells. This causes self-discharging in the form of inter-cell shunt currents which detract from performance and shorten the life of the battery. The severity of this problem would increase in proportion to the number of cells connected in series.

A floating seawater battery has been described in French Pat. No. 1,176,958 published April 17, 1959 in the name of the inventor, J. C. Lafaille. Disclosed is essentially a battery of the second class described above housed in a buoyant case with sufficient ballast to ensure that both electrodes are totally immersed in seawater, while the top of the battery case remains above the surface. U.S. Pat. No. 3,598,655 which issued on Aug. 10, 1971 to R. P. Hamlen et al, describes the use of an absorbent electrolyte matrix with a metal/air cell wherein the matrix contacts both electrodes and neither electrode is immersed in the electrolyte.

It is therefore an object of the invention to provide a floating metal/air cell which does not require immersion of the cathode in the electrolyte.

According to one aspect of the invention, a floating metal/air battery is contemplated, comprising
(a) a metal anode,
(b) an air cathode,
(c) means for completing an electro-conductive path from the anode to the cathode, and
(d) floatation means, such that in use the metal anode is immersed in a suitable electrolyte and wherein the completing means is in contact with the electrolyte.

Figure 7:
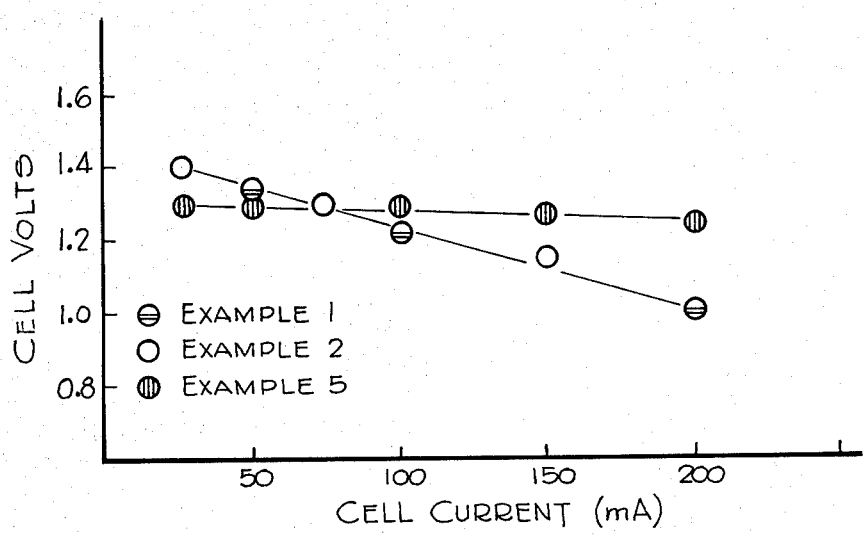

In the drawings which illustrate embodiments of the invention,

FIG. 1 is a perspective view of a single cell according to the invention, illustrating the arrangement of the various components, FIG. 1A is a perspective view of one embodiment of the floatation means according to the invention and is located on the page of drawings containing FIGS. 3 and 4, FIG. 2 is a side elevation in section of a single cell according to the invention, shown floating on a body of liquid, FIG. 2A is a side elevation in section, illustrating another embodiment of a single cell according to the invention floating on a body of liquid, FIG. 3 is a side elevation in section of yet another embodiment of a single cell according to the invention floating on a body of liquid, FIG. 4 is a perspective view of a multi-cell battery according to the invention, FIG. 5 is a plan view, illustrating the separate electrolyte compartments for each cell of the battery illustrated in FIG. 4, specifically identifying the location of the cell ports, and is located on the page of drawings containing FIG. 1, FIG. 6 is a perspective view of a single cell according to the invention adapted for fresh water use, and is located on the page of drawings containing FIG. 1, FIG. 7 is a graph ilustrating the relationship between cell voltage and current in various embodiments of the invention, and FIG. 8 is a graph illustrating the relationship between voltage and time in the various embodiments of the invention.

Referring to the drawings, with particular reference to FIGS. 1 and 2, a single cell embodiment according to the invention is seen to comprise an air cathode 1, a sheet metal anode 5, means for completing an electroconductive path from the anode to the cathode, in the form of an absorbent wick 2, and floatation means in the form of a pair of floats 3. The air cathode 1, to which is attached the absorbent wick 2 is mounted on the floats 3 so that the wick lies between the floats 3 and extends into opening 20.

The sheet metal anode 5, slides into channels 6, which are attached to the bottom of the floats 3. A thin slat 4 connects one pair of the ends of the floats 3 to provide structural strength.

The air cathode may lie flat or be constructed to facilitate run-off of liquid upon which the battery is floating as illustrated in FIG. 2 wherein the cathode is raised in the center. In use, the metal anode is immersed in a suitable electrolyte and the wick is in contact with the electrolyte. In the arrangement of FIGS. 1 and 2, the electrolyte is seawater upon which the cell is floating. When the cell is placed in seawater or some other saline electrolyte 7, the cell floats and the wick 2 draws up seawater to the bottom surface of the air cathode 1 to complete an electro-or ion-conductive path from the anode to the cathode. An electrical load may be connected between the anode lead-off 8, and the cathode lead-off 9, and a current drawn from the cell.

In the embodiment illustrated in FIGS. 1A and 2A, the float 3 comprises a single rectangular member with the opening 20 located centrally thereof. The opening 20 is closed at one end by the sheet metal anode 5 and is open to the atmosphere at the other end. An opening 21 is provided in either the float at a point below the water line or in the anode 5 to permit entry of the electrolyte into opening 20 to contact the wick 2.

In both of the above arrangements, the floatation means effectively acts as separator for the anode and cathode.

Multi-cell batteries have also been constructed. A three-cell battery is shown in FIG. 4. Three air cathodes 1, complete with wicks 2, are mounted on a buoyant frame 10. Three sheet metal anodes 5, are held in channels 6, and the three cells are connected electrically in series by current conducting wires 11. This assembly forms the top of a box 12, made up of three compartments 21. Each anode protrudes into a separate compartment 21 of the box 12 and a battery is formed composed of three isolated compartments 21 i.e. cells connected only by the external wiring 11. The cathodes do not completely cover the openings in the buoyant frame 10 and the battery can be activated by pushing it below the surface of the sea until each compartment is filled with seawater and then releasing the battery and allowing it to float. alternatively, the compartments 21 may be pre-filled with a suitable electrolyte. With this design there are no conductive electrolyte paths between the cells. Thus the inter-cell shorting problem associated with conventional seawater batteries is substantially eliminated.

This particular design, having enclosed cell compartments and no shunt paths between cells, can be adapted for use in fresh water. Such an embodiment is illustrated in FIG. 6 and will be discussed in detail in the following examples. A soluble ionic conductor such as a suitable salt, acid or base may be added to each cell compartment either before or after filling with water. The choice of ionic conductor would be determined by the nature of the metal anode. A salt, such as sodium chloride, potassium chloride or lithium chloride, would be used in conjunction with a magnesium anode, while a base, such as potassium hydroxide or sodium hydroxide, would be more suitable with a zinc anode.

For some seawater applications it may be desirable to have a port in each cell to permit the exit of reaction products and to prevent the cell from drying out. However, in most applications there is sufficient wave motion and splashing to replenish the electrolyte. To maximize the resistance of the shunt current paths the area of cross-section of the ports should be minimized and the lengths of the paths between ports maximized. FIG. 5 illustrates how this is accomplished in a 3- cell battery by drilling small circular ports 13, in the bottom of the battery box 12, one port in each compartment. This battery design in which cells are arranged end to end ensures shunt paths of higher resistance than does the conventional design mentioned previously in which cells are arranged side by side.

In all the designs described so far the anode has been mounted parallel to and directly opposite the cathode so that the electrodes are face to face. It is also possible to mount the anode substantially perpendicular to the cathode as shown in FIG. 3. In this arrangement a flexible frame 14 is placed around the perimeter of the anode 5, and attached by a suitable filament 15, to the floats 3, so that the anode hangs substantially vertically when the cell is placed in seawater.

There is a requirement for a seawater battery capable of operating at voltages greater than 1.5 V and delivering currents of about 100 mA during two or more months of continuous operation. A number of anode materials such as magnesium, aluminum, zinc and their alloys could be used in this type of battery. The problem has been to find a suitable cathode material which meets all the requirements.

There are two ways by which a conventional seawater battery could be constructed to obtain the desired voltage. The battery voltage could be increased to the required value by connecting a number of low voltage cells in series. As mentioned previously, since seawater is used as an electrolyte common to all cells, current paths would exist between cells through the electrolyte and the battery would self-discharge through these ionic shunt currents as well as discharging through the external load.

A second method would be to use a single cell with a converter to step up the cell voltage to the required value. In order for the converter to operate efficiently, the cell voltage should not be less than about 1 volt. A cell employing silver chloride as the cathode would give an acceptable voltage but the high cost of silver chloride precludes it use in the quantities required for a long life battery. Cuprous chloride would also give a cell with sufficient voltage but it has a poor shelf life and has not been developed for applications requiring extended operation. Large lead chloride cathodes having the necessary electrical capacity have been made but the cell voltages have been too low for the efficient operation of a convertor.

It is, therefore proposed by applicant to use a floating metal/air battery employing an air cathode. An air cathode has a potential about 200 mV more positive than that of a lead chloride cathode and when coupled with a metal anode such as magnesium the voltage of the resulting metal/air cell should be in the range 1.0 to 1.5 V.

During discharge of the cell oxygen from the air is reduced at the cathode according to the following reaction

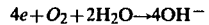

and the metal anode is oxidized.

When the metal anode has been consumed, it can be replaced with a fresh one and the cell used again. As the cathode is not consumed during the discharge it can be used indefinitely.

A variety of air cathodes may be used in the construction of this cell. One described in applicant's Canadian Pat. No. 968,847 which issued June 3, 1975, has proved satisfactory.

Any wicking material which is stable in seawater may be incorporated in the cell. A glass-Vinyon paper developed by applicant, which is the subject of his co-pending Canadian Application Ser. No. 299,604 filed on Mar. 23, 1978 has proven satisfactory. The preferred composition of the paper was 30% glass—70% Vinyon in the form of a paper having a basis weight of 90 g/m². The glass was Type 475 supplied by Johns-Manville having a fiber diameter of 0.2μ. The Vinyon, a copolymer of vinyl acetate and vinyl chloride, was Vinyon HH(No. 23, Bright, 3 denier, ¼inch) from FMC Corporation.

Expanded polystryrene (styrofoam) floats provided the buoyancy and stability required while polyethylene automobile door protectors were used as channels to support the anode. The most suitable anode materials are alloys of aluminum or zinc, specially developed for optimum electrical potential and resistance to corrosion. Anodes of either magnesium or zinc were used and adequately demonstrated the advantages of the invention.

The following examples are included to illustrate the preferred embodiments of the invention.

EXAMPLE 1

The construction of Example 1 is illustrated in FIGS. 1 and 2. The end of a strip of glass-Vinyon paper 2, (6.4×112 cm) was pressed onto an air cathode of dimensions (7.0×8.0 cm) prepared as described in the aforementioned Canadian Pat. No. 968,847 and comprising about 3.6 mg/cm$^2$ manganese dioxide, 20 mg/cm$^2$ activated carbon and 5.2 mg/cm$^2$ polytetrafluoroethylene, spread evenly on both sides of a nickel screen, so that the surface of the cathode was covered with paper except for two strips (0.3×8.0 cm) on opposite edges of the cathode. The paper was folded in a zig-zag fashion so that the surface of the cathode was covered with 14 layer of paper, each layer being (6.4×8 cm). This sub-assembly was attached, by means of a latex cement applied to the cathode along the two bare strips, to two expanded polystyrene (density 0.0343 g/cm$^3$) floats 3, each (4.5×10×1.2 cm) in such a manner, that the folded paper wick lay between the two floats. To the opposite side of each float was cemented a polyethylene channel 6. A slat of polymethylmethacrylate (2×12×0.2 cm) 4, was cemented across one pair of ends of the floats. A sheet of magnesium alloy 5, designated AZ31 and of dimensions (8×9.5×0.10 cm) to which a current lead-off wire 8, had been spot-welded, was inserted into the channels so that the paper wick rested on the face of the magnesium sheet.

The cell was placed, floating, in an open vessel containing 50 l of artificial seawater (3.25% w/w aqueous sodium chloride solution), 7. The current lead-offs, 8 and 9, were connected to a variable resistance and the cell voltage measured for various current drains. The results are shown in FIG. 7. After these measurements had been completed, the resistor was adjusted so that the cell discharged at a current of 100 mA. The results are plotted in FIG. 8.

EXAMPLE 2

Example 2 is illustrated in FIG. 3. An air cathode 1, as in example 1, equipped with a paper wick 2, was attached to two expanded polystyrene floats 3. Each of the components had the same dimensions and properties as described in Example 1. Two slats 4, (1.5×12×0.2 cm) of polymethylmethacrylate were used to join together the ends of the floats. A sheet of magnesium alloy 5, of the type and dimensions described in Example 1 and being equipped with a current lead-off 8, was fitted with a flexible frame 14, made by slitting lengthwise a piece of rubber tubing 0.5 cm in diameter. A nylon filament 15, was attached to each end of the flexible frame and the magnesium anode was suspended vertically from the floating platform. The cell was placed in artifical seawater 7, the current lead-offs 8 and 9, connected to a variable resistor and the cell voltage measured for various current drains. The results are shown in FIG. 7. After these measurements had been taken, the resistor was adjusted so that the cell discharged at a current of 200 mA. The results are plotted in FIG. 8.

In this configuration, the current lead-off 8 is attached to the bottom of the anode 5, since it tends to be consumed from the top downward; It was found that if the lead-off is attached to the top of the anode it may become disconnected before the anode is completely used up.

EXAMPLE 3

A three-cell battery was prepared as illustrated in FIG. 4 using three air cathodes 1, as in example 1, with wicks 2, three pairs of channels 6, and three magnesium anodes 5. Each of these components had the same dimensions and properties as described in Example 1. The floatation frame 10, consisted of a piece of expanded polystyrene (14×37.5×1.2 cm) in which had been cut three equally spaced openings, each (7×10 cm). The air cathodes were attached to the frame in the manner described in Example 1 and the cells were connected electrically in series by current carrying wire 11. This assembly was cemented to form the top of a box 12, of dimensions (14×37.5×5 cm) made of 0.2 cm thick polymethylmethacrylate and divided into three chambers of equal dimensions by two pieces of polymethylmethacrylate (4.8×13.6×0.2 cm). There was no electrolyte path between the chambers. The battery was activated by forcing it under the surface of the artificial seawater until each cell was filled. The battery was then released and allowed to rise and float on the surface. The battery current lead-offs 8 and 9, were connected to a variable resistor which was adjusted so that the battery discharged at a current drain of 100 mA. The results are plotted in FIG. 8.

EXAMPLE 4

A three cell battery was made in the same manner as Example 3 the only difference being the drilling of a port 0.15 cm in diameter in the bottom of each cell chamber. As shown in FIG. 5, the ports 13, were separated by the maximum distance possible. When the battery was placed on the surface of the arificial seawater, the saline solution entered each cell through the ports. The battery current lead-offs 8 and 9, were connected to a variable resistor which was adjusted so that the battery discharged at a current drain of 100 mA. A comparison of the results, plotted in FIG. 8, with those obtained with Example 3 show that the ports introduced shunt current paths which decreased the duration of discharge by only about 7%.

EXAMPLE 5

A single cell for use in fresh water was prepared as illustrated in FIG. 6 using an air cathode 1, as in example 1, a paper wick, 2 and two channels 6. Each of these components had the same dimensions and properties as described in Example 1. The The floatation frame 10, consisted of a piece of expanded polystyrene (14×19.5×1.2 cm) in which had been cut a centrally located (7×10 cm) opening 20. The anode 5, was a sheet of zinc (8.0×9.5×0.12 cm) to which had been spot-welded a current lead-off 8. An assembly consisting of the floatation frame, air cathode, wick, channels and zinc anode was placed over and cemented to a reservoir for the electrolyte, conveniently in the form of a box 18, of dimensions (12.5×14×2.0 cm) made of 0.2 cm thick polymethylmethacrylate in such a manner that the anode and wick extend into the box. the reservoir is made deeper in this embodiment to minimize the dilution of electrolyte problem, which may occur in rough waters. Eighty-eight grams of potassium hydroxide was introduced in the form of pellets 19, into the box. The cell was activated by submerging the cell in distilled water until the box was full. the cell was then released and allowed to float. The current lead-offs 8 and 9, were connected to a variable resistor and the cell voltage measured for various current drains. The results are shown in FIG. 7. After these measurements had been taken, the resistor was adjusted so that the cell discharged at 100 mA. The results are plotted FIG. 8

The results illustrated in FIGS. 7 and 8 demonstrate that a buoyant metal/air cell can be operated in either fresh water or seawater, depending upon the cell design, at current drains which correspond to current densities of 1 to 4 mA/cm$^2$ (with respect to the air electrode) while maintaining a cell voltage greater than 1 V. Results in FIG. 8 further show that multi-cell batteries of voltage greater than 1.5 V can be constructed in such a manner that battery self-discharge through inter-cell shunt currents is either minimized or substantially eliminated. Thus, the requirement of a seawater battery capable of operating at voltages greater than 1.5 V and delivering currents of about 100 mA for extended periods of time can be met by either a multi-cell buoyant metal/air battery or a single cell having a voltage in the range 1 to 1.4 V used in conjunction with a conventional converter to step up the voltage to the required value.

It will be appreciated by those skilled in the art that while the invention has been described in conjunction with specific embodiments thereof, it is evident that many alternatives, modifications and variations are possible without departing from the spirit and central characteristics of the invention. Accordingly, it is intended to embrace all such alternatives, modifications and variations which fall within the spirit and scope of the appended claims.

The embodiments of the invention in which an exclusive property or privilege is claimed are defined as follows:

1. A floating metal/air battery, comprising
   (a) a metal anode,
   (b) an air cathode,
   (c) means for completing an electro-conductive path from the anode to the cathode, and
   (d) floatation means, such that in use the metal anode is immersed in a suitable electrolyte and wherein the completing means is in contact with the electrolyte.

2. A battery according to claim 1, wherein the electrolyte is selected from solutions in water of suitable salts, bases and acids.

3. A battery according to claim 2, wherein the metal anode is selected from magnesium, aluminum, zinc and suitable alloys thereof.

4. A battery according to claim 3, wherein the cathode is constructed to facilitate run-off of liquid upon which the battery is floating.

5. A battery according to claim 4, wherein the anode and cathode are arranged substantially parallel to each other.

6. A battery according to claim 5, wherein the floatation means separates the anode and cathode.

7. A battery according to claim 6, wherein said completing means is a wick attached to the cathode, made of a suitable electrolyte absorbent material which is stable in the electrolyte.

8. A battery according to claim 7, wherein the material is a glass-vinyon paper.

9. A battery according to claim 8, wherein the floatation means includes an opening therethrough, and wherein the wick is positioned in said opening.

10. A battery according to claim 9, wherein the electrolyte is sea water upon which the battery is floating.

11. A battery according to claim 9, wherein the floatation means comprises a pair of floating members, said opening being between said members.

12. A battery according to claim 10, wherein the floatation means comprises a rectangular frame member, said opening being located centrally thereof and being closed at one end by the anode to define a compartment open at the other end, and wherein a second opening is provided in said compartment to permit entry of the electrolyte to contact said wick.

13. A battery according to claim 12, wherein said second opening is provided in said float below the water line.

14. A battery according to claim 12, wherein said second opening is provided in the anode.

15. A battery according to claim 7, wherein the anode and cathode are arranged substantially perpendicular to each other.

16. A battery according to claim 9, wherein the floatation means comprises a rectangular frame member, said opening being located centrally thereof, and further comprising a reservoir for said electrolyte attached to said frame such that the anode and wick extend into the reservoir.

17. A battery according to claim 16, further comprising a plurality of separate spaced cells electrically connected in series.

18. A battery according to claim 17, including a port in each cell to provide an electrolyte path between the cells, said ports being located to maximize the distance between the ports in adjacent cells.

19. A battery according to claim 9, 16 or 17, wherein the air cathode comprises about 3.6 mg/cm$^2$ manganese dioxide, 20 mg/cm$^2$ activated carbon and 5.2 mg/cm$^2$ polytetrafluoroethylene, spread evenly on both sides of a nickel screen.

* * * * *